(12) United States Patent
Wang et al.

(10) Patent No.: US 11,703,738 B2
(45) Date of Patent: Jul. 18, 2023

(54) ELECTRONIC APPARATUS (71) Applicant: E Ink Holdings Inc., Hsinchu (TW)

(72) Inventors: Hsing-Kai Wang, Hsinchu (TW);
Chen-Chu Tsai, Hsinchu (TW);
Chia-Chun Yeh, Hsinchu (TW);
Yi-Sheng Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 276 days.

(21) Appl. No.: 17/008,590

(22) Filed: Aug. 31, 2020

(65) Prior Publication Data
US 2021/0080794 A1 Mar. 18, 2021

(30) Foreign Application Priority Data
Sep. 12, 2019 (TW) ................................ 108133083

(51) Int. Cl.
G02F 1/16753 (2019.01)
G02F 1/1333 (2006.01)
G02F 1/16755 (2019.01)
G02F 1/167 (2019.01)

(52) U.S. Cl.
CPC .... *G02F 1/16753* (2019.01); *G02F 1/133305* (2013.01); *G02F 1/16755* (2019.01); *G02F 1/167* (2013.01); *G02F 2201/50* (2013.01)

(58) Field of Classification Search
CPC .. G02F 1/16753; G02F 1/167; G02F 1/16755; G02F 1/133305
See application file for complete search history.

(56) References Cited

U.S. PATENT DOCUMENTS 9,823,700 B2 11/2017 Lee et al.
10,038,170 B2 7/2018 Wen et al.
10,061,358 B2 8/2018 Lee et al.
(Continued)

FOREIGN PATENT DOCUMENTS

CA 3004276 A1 * 4/2011
CN 104407675 A 3/2015
(Continued)

OTHER PUBLICATIONS

Corresponding China office action dated Feb. 16, 2022.
The office action of the corresponding Taiwan application dated Oct. 23, 2020.

*Primary Examiner* — Dung T Nguyen
(74) *Attorney, Agent, or Firm* — CKC & Partners Co., LLC (57) ABSTRACT An electronic apparatus includes a flexible display device and a roller. The flexible display device includes a driving substrate, a display layer on the driving substrate, and a front protective layer covering the display layer. The flexible display device has an end portion fixed to the roller. The roller includes a holding groove, a receiving slot, and a retraction assembly. The holding groove is recessed from an external surface of the roller. The end portion is in the holding groove. The flexible display device further includes a main body portion outside the holding groove. A thickness of the end portion is less than a thickness of the main body portion. The receiving slot is recessed from the external surface. The retraction assembly is disposed in the receiving slot. When the retraction assembly abuts against the flexible display device, the retraction assembly is pressed into the receiving slot.

7 Claims, 5 Drawing Sheets (56) References Cited

U.S. PATENT DOCUMENTS

| | | |
|---|---|---|
| 10,126,778 B2 | 11/2018 | Yang |
| 2015/0227171 A1 | 8/2015 | Choi et al. |
| 2017/0115701 A1 | 4/2017 | Bae et al. |
| 2017/0141168 A1 | 5/2017 | Choi |
| 2017/0318689 A1 | 11/2017 | Kim et al. |
| 2018/0014415 A1 | 1/2018 | Choi et al. |
| 2019/0098776 A1 | 3/2019 | Jeon |
| 2019/0182947 A1 | 6/2019 | Xiang et al. |
| 2019/0212781 A1 | 7/2019 | Fujimoto |

FOREIGN PATENT DOCUMENTS

| | | |
|---|---|---|
| CN | 104835417 A | 8/2015 |
| CN | 106575664 A | 4/2017 |
| CN | 107369383 A | 11/2017 |
| CN | 108139773 A | 6/2018 |
| CN | 108230937 A | 6/2018 |
| CN | 109872639 A | 6/2019 |
| CN | 110211506 A | 9/2019 |
| TW | 201604850 A | 2/2016 |
| TW | 201802781 A | 1/2018 |
| TW | I648717 B | 1/2019 |
| WO | 2016101228 A1 | 6/2016 |
| WO | 2017113243 A1 | 7/2017 |
| WO | 2018192426 A1 | 10/2018 |
| WO | 2019029111 A1 | 2/2019 |
| WO | 2019051967 A1 | 3/2019 |

* cited by examiner

ELECTRONIC APPARATUS

CROSS-REFERENCE TO RELATED APPLICATION

This application claims priority to Taiwan Application Serial Number 108133083, filed Sep. 12, 2019, which is herein incorporated by reference in its entirety.

BACKGROUND

Field of Invention

The present invention relates to an electronic apparatus.

Description of Related Art

The flexible display is lighter, thinner and more portable compared to traditional displays. For example, the flexible display can be carried by rolling it on a roller. A traditional way to fix the flexible display on the roller is a tape fixing method. However, during rolling the flexible display, due to a stacking structure of the flexible display and a step phenomenon caused by an tape, after the flexible display is rolled several times, the stress is concentrated at a part of the flexible display, resulting in damage to the display screen. And even the circuits on the flexible display can be stressed by the stress as well and be damaged and fail.

In addition, after the stacking structure of the flexible display being rolled several times, a compressive stress and a tensile stress are concentrated at the inside and outside of the flexible display, respectively. And since a difference between an inside circumstance and an outside circumstance of the flexible display device is produced after the rolling, there is a problem of delamination in the stacking structure of the flexible display. In particular, a part of the flexible display close to the end thereof can have more severe phenomena of misalignment of film layers.

SUMMARY

The invention provides an electronic apparatus having a reduced stress during rolling.

In one embodiment, an electronic apparatus includes a flexible display device and a roller. The flexible display device includes a driving substrate, a display layer and a front protective layer. The display layer is over the driving substrate. The front protective layer covers the display layer. An end portion of the flexible display device is fixed to the roller. The roller includes a holding groove, a receiving slot and a retraction assembly. The holding groove is recessed from an external surface of the roller. The end portion of the flexible display device is in the holding groove. The flexible display device further includes a main body portion outside the holding groove. A thickness of the end portion is less than a thickness of the main body portion. The receiving slot is recessed from the external surface of the roller. The retraction assembly is disposed in the receiving slot. When the retraction assembly abuts against the flexible display device, the retraction assembly is pressed into the receiving slot.

In one embodiment, the holding groove has an inner wall, and the roller has a round-corner at the external surface adjoining the inner wall.

In one embodiment, the retraction assembly includes a resilient member and a movable part. The resilient member has a first end on a bottom of the receiving slot. The movable part is on a second end of the resilient member far away from the first end and is configured to abut against the flexible display device.

In one embodiment, the movable part has an elastic surface backs onto the resilient member. A junction of the elastic surface and a side wall of the movable part form a round-corner.

In one embodiment, the retraction assembly is a plurality of retraction assemblies. The retraction assemblies are arranged symmetrically with respect to a center of the roller.

In one embodiment, an electronic apparatus includes a flexible display device, a roller, and an adhesive layer. The flexible display device includes a driving substrate, a display layer and a front protective layer. The display layer is over the driving substrate. The front protective layer covers the display layer. A length of the front protective layer is less than a length of the driving substrate. An end portion of the flexible display device is fixed to the roller. The roller includes a recessed portion. The adhesive layer is between the end of the flexible display device and the recessed portion of the roller.

In one embodiment, the adhesive layer has a top surface and a bottom surface opposite to each other. The top surface and the bottom surface of the adhesive layer are in contact with the recessed portion of the roller and a top surface of the driving substrate, respectively.

In one embodiment, the roller further includes a receiving slot and a retraction assembly. The receiving slot is recessed from an external surface of the roller. The retraction assembly is disposed in the receiving slot. The retraction assembly is adjacent to the recessed portion.

In one embodiment, the retraction assembly is a plurality of retraction assemblies. The retraction assemblies are arranged symmetrically with respect to a center of the roller.

In one embodiment, the recessed portion is a plurality of recessed portions. The recessed portions are arranged symmetrically with respect to a center of the roller.

In one embodiment, the retraction assembly includes a resilient member and a movable part. The resilient member has a first end on a bottom of the receiving slot. The movable part is on a second end of the resilient member far away from the first end and is configured to abut against the flexible display device.

In one embodiment, the movable part has an elastic surface backs onto the resilient member. The elastic surface is configured to abut against the flexible display device.

In one embodiment, an electronic apparatus includes a flexible display device and a roller. The flexible display device includes a driving substrate, a display layer and a front protective layer. The display layer is over the driving substrate. The front protective layer covers the display layer. An end portion of the flexible display device is fixed to the roller. The roller includes a holding groove and a recessed portion. The holding groove is recessed from an external surface of the roller. The end portion of the flexible display device is in the holding groove. The flexible display device further includes a main body portion outside the holding groove. A length of the front protective layer is less than a length of the driving substrate. The holding groove is in the recessed portion.

In one embodiment, the recessed portion is a plurality of recessed portions. The recessed portions are arranged symmetrically with respect to a center of the roller.

In one embodiment, a thickness of the end of the flexible display device is less than a thickness of the main body portion.

Based on the above, the electronic apparatus of one embodiment of the present disclosure can reduce the stress concentration at the end portion of the flexible display device by using the roller including the holding groove or the adhesive layer. In particular, since the thickness of the end portion is less than the thickness of the main body portion, a circumference difference of an inside diameter and an outside diameter of the flexible display device after rolling can be reduced, thereby reducing stress concentration at the end portion of the flexible display device. An advantage of avoiding misalignment of film layers of the flexible display device is achieved. In particular, during rolling the flexible display device, by the retraction assembly collapsing towards the center of the roller, the stress concentration of the flexible display device which is produced during the rolling can be avoided. The misalignment of film layers of the flexible display device is avoided as well.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1A:
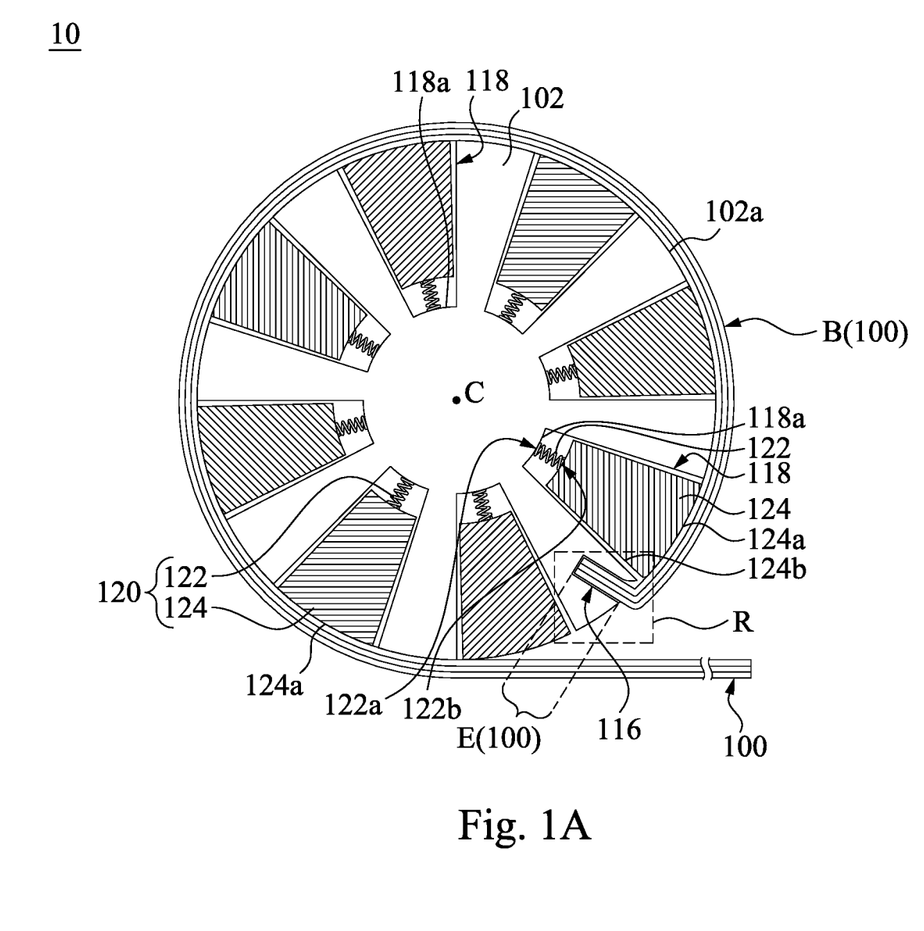
FIG. 1A is a cross-sectional view of an electronic apparatus in accordance with one embodiment of the present disclosure.
Figure 1B:
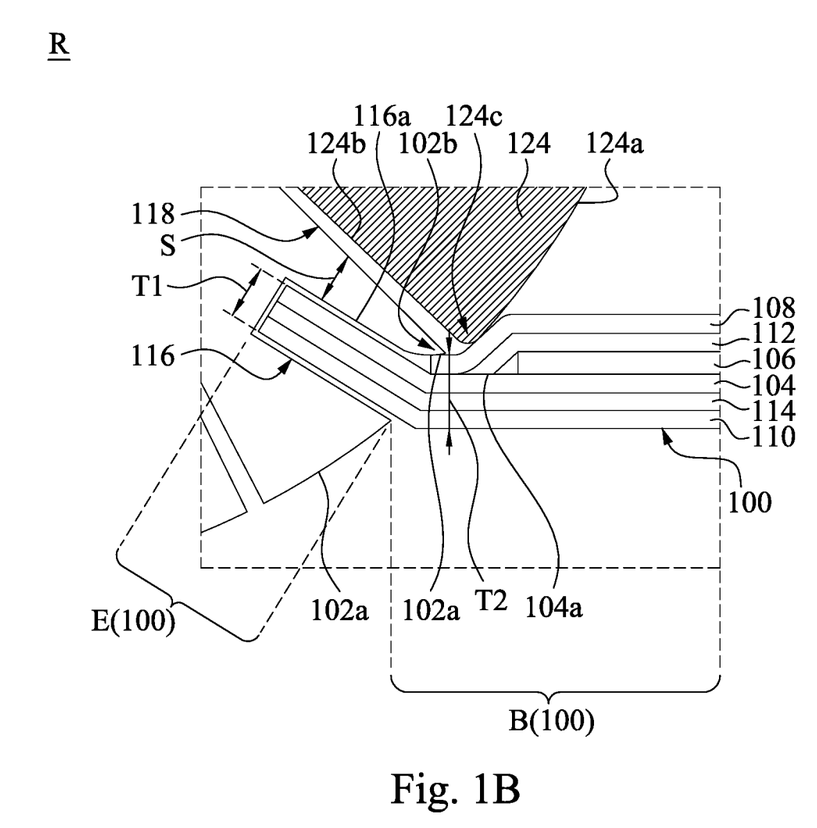
FIG. 1B is an enlarged view of the region R in FIG. 1A.

FIG. 1A is a cross-sectional view of an electronic apparatus 10 in accordance with one embodiment of the present disclosure. FIG. 1B is an enlarged view of the region R in FIG. 1A. Reference is made to FIGS. 1A and 1B. The electronic apparatus 10 includes a flexible display device 100 and a roller 102. The flexible display device 100 has a main body portion B and an end portion E. The end portion E of the flexible display device 100 is fixed to the roller 102. The roller 102 is configured to roll or expand the flexible display device 100. The flexible display device 100 includes a driving substrate 104, a display layer 106, a front protective layer 108, and a back protective layer 110. The display layer 106 is on the driving substrate 104. The front protective layer 108 covers the display layer 106 and is attached to a top surface 104a of the driving substrate 104 through a glue layer 112. The back protective layer 110 is on a bottom surface of the driving substrate 104 and is attached to the driving substrate 104 through a glue layer 114. The front protective layer 108 and the back protective layer 110 can be configured to prevent moisture and ultraviolet light from penetrating the display layer 106 and the driving substrate 104. In the present embodiment, a material of the front protective layer 108 can include organic materials.

For example, the driving substrate 104 is, but is not limited to, an active device array substrate. In particular, the driving substrate 104 is a thin film driving substrate formed of a flexible plastic material or a metal material such that the electronic apparatus 10 is thin and portable. In the present embodiment, the display layer 106 may be an electrophoretic display layer.

In the present embodiment, the roller 102 includes a holding groove 116. The holding groove 116 is recessed from an external surface 102a of the roller 102 and is configured to fix the flexible display device 100 to the roller 102. The end portion E of the flexible display device 100 is in the holding groove 116. In the present embodiment, a thickness T1 of the end portion E of the flexible display device 100 is less than a thickness of the main body portion B (e.g., the minimum thickness T2 of the main body portion B) (see FIG. 1B). A length of the front protective layer 108 is less than a length of the driving substrate 104. The front protective layer 108 does not extend to the end portion E of the flexible display device 100. In other words, the front protective layer 108 is outside the holding groove 116 of the roller 102. Therefore, a circumference difference between an inside diameter and an outside diameter of the flexible display device 100 after being rolled by the roller 102 can be reduced, thereby reducing stress concentration at the end portion E of the flexible display device 100. A misalignment of film layers of the flexible display device 100 is avoided as well.

In particular, the roller 102 further has a receiving slot 118 and a retraction assembly 120. The receiving slot 118 is recessed from the external surface 102a of the roller 102. And the receiving slot 118 which is closest to the holding groove 116 and the holding groove 116 are separated from each other by a distance S. The retraction assembly 120 is disposed in the receiving slot 118. When the roller 102 starts to roll the flexible display device 100, the retraction assembly 120 may be in contact with the flexible display device 100. In the present embodiment, when the retraction assembly 120 abuts against the flexible display device 100, the retraction assembly 120 can be pressed into the receiving slot 118. During rolling the flexible display device 100, by the retraction assembly 120 collapsing toward the center C of the roller 102, the stress concentration at the flexible display device 100 which is produced during the rolling can be avoided. The misalignment of film layers of the flexible display device 100 can be avoided as well.

In the present embodiment, the retraction assembly 120 includes a resilient member 122 and a movable part 124. The resilient member 122 is between the movable part 124 and the center C of the roller 102. The resilient member 122 has a first end 122a on a bottom 118a of the receiving slot 118. The movable part 124 is on a second end 122b of the resilient member 122 far away from the first end 122a and is configured to abut against the flexible display device 100. During the flexible display device 100 being rolled by the roller 102, the movable part 124 can abut against the flexible display device 100. Therefore, the movable part 124 is pressed into the receiving slot 118. That is to say, the movable part 124 moves towards the center C of the roller 102 such that the resilient member 122 is compressed towards the center C of the roller 102. In other words, by the elastic deformation of the resilient member 122, the resilient member 122 and the movable part 124 can collapse and absorb the stress of the flexible display device 100 which is produced during the rolling. In the present embodiment, the resilient member 122 can be, but is not limited to, a spring. Other elastic materials can be used as the resilient member 122 as well.

In the present embodiment, the movable part 124 has an elastic surface 124a backed onto the resilient member 122 such that an external surface of the movable part 124 can be elastic and further enhance the collapse effect of the retraction assembly 120. In addition, a junction of the elastic surface 124a and a side wall 124b of the movable part 124 form a round-corner 124c. Therefore, it is possible to prevent the end portion E of the flexible display device 100 from being fractured due to being bent.

The holding groove 116 has an inner wall 116a. The roller 102 has a round-corner 102b at the external surface 102a adjoining the inner wall 116a. When the flexible display device 100 is bent, the end portion E of the flexible display device 100 which is in contact with the round-corner 102b can be uniformly stressed. Therefore, it is possible to prevent the end portion E of the flexible display device 100 from being fracture due to an excessive stress concentration thereat.

In one embodiment, the retraction assembly 120 is a plurality of retraction assemblies, and the retraction assemblies 120 are arranged symmetrically with respect to the center C of the roller 102. In this way, during the rolling, the stress concentration at the flexible display device 100 can be further reduced.

Figure 2A:
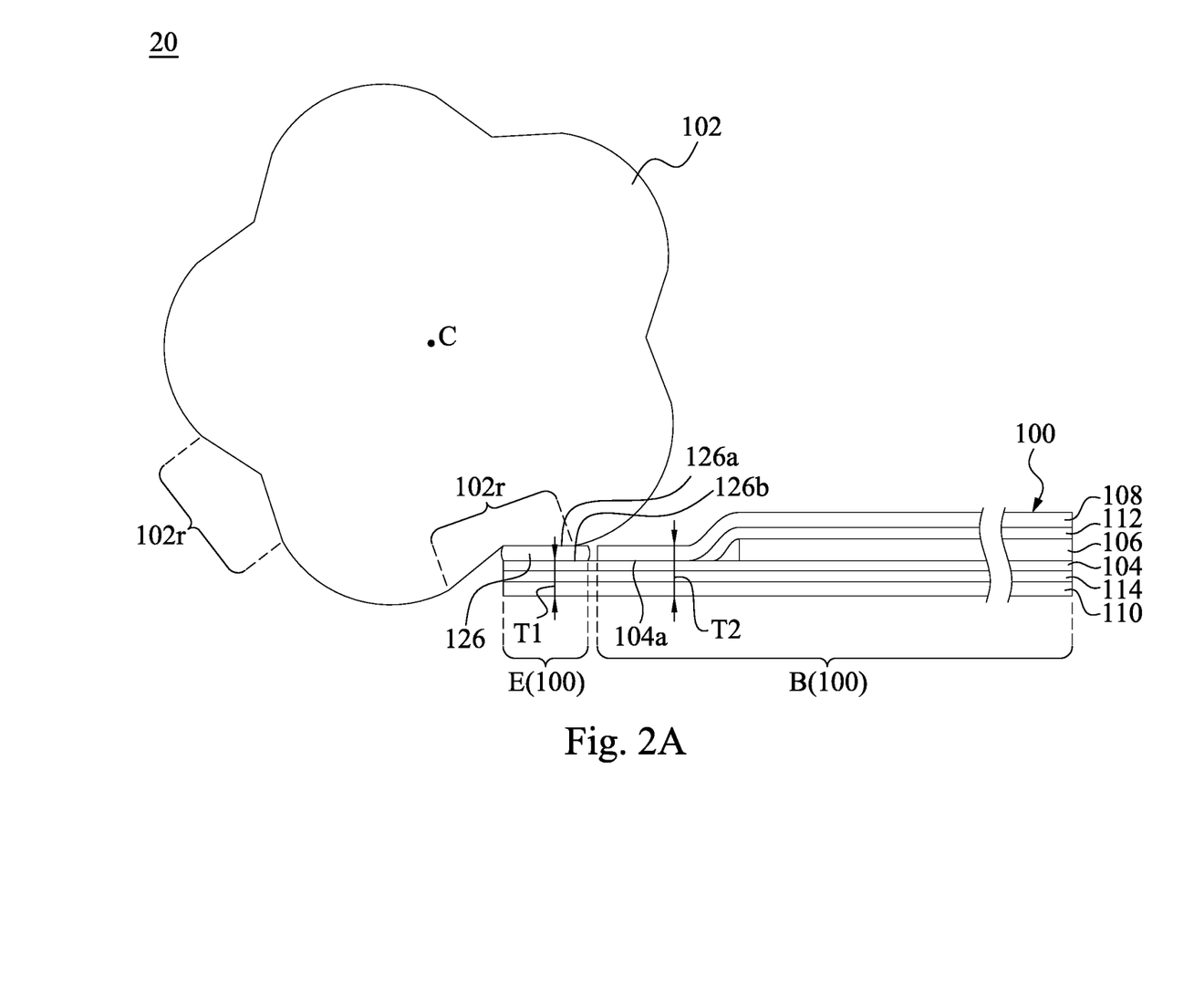
FIG. 2A is a cross-sectional view of an electronic apparatus in accordance with another embodiment of the present disclosure.

FIG. 2A is a cross-sectional view an electronic apparatus 20 in accordance with one embodiment of the present disclosure. Reference is made to FIG. 2A. The electronic apparatus 20 includes a flexible display device 100, a roller 102 and an adhesive layer 126. The adhesive layer 126 is between the end portion E of the flexible display device 100 and the roller 102 in order to fix the flexible display device 100 on the roller 102.

In the present embodiment, the roller 102 has at least one recessed portion 102r. The adhesive layer 126 is between the end portion E of the flexible display device 100 and the recessed portion 102r of the roller 102. This configuration can reduce the stress concentration at the end portion E of the flexible display device 100 during the rolling. The adhesive layer 126 has a top surface 126a and a bottom surface 126b opposite to each other. The top surface 126a of the adhesive layer 126 is in contact with the recessed portion 102r of the roller 102. Therefore, even if the flexible display device 100 after the rolling is stressed due to the circumference difference of the inside diameter and the outside diameter of the flexible display device 100, the stress may not be concentrated at a fixed position of flexible display device 100 on the roller 102. In other words, the stress concentration at the end portion E of the flexible display device 100 can be reduced and a risk of the misalignment of film layers of the flexible display device 100 can be reduced. In the present embodiment, since the thickness T1 of the end portion E of the flexible display device 100 is less than the thickness of the main body portion B (e.g., the minimum thickness T2 of the main body portion), the length of the front protective layer 108 is less than the length of the driving substrate 104. The front protective layer 108 does not extend to the end portion E of the flexible display device 100. Therefore, the circumference difference of the inside diameter and the outside diameter of the flexible display device 100 after being rolled by the roller 102 can be reduced, thereby reducing the stress concentrated at the end portion E of the flexible display device 100 and avoiding a problem of the misalignment of film layers of the flexible display device 100 as well.

When the roller 102 starts to roll the flexible display device 100, the recessed portion 102r is in contact with the flexible display device 100. Therefore the stress concentrated at the flexible display device 100 can be avoided to reduce the stress concentrated at the end portion E of the flexible display device 100. In one embodiment, the recessed portion 102r is a plurality of recessed portions. The recessed portions 102r are arranged symmetrically with respect to the center C of the roller 102. Therefore, during the rolling, the stress concentration at the flexible display device 100 can be further reduced.

Figure 2B:
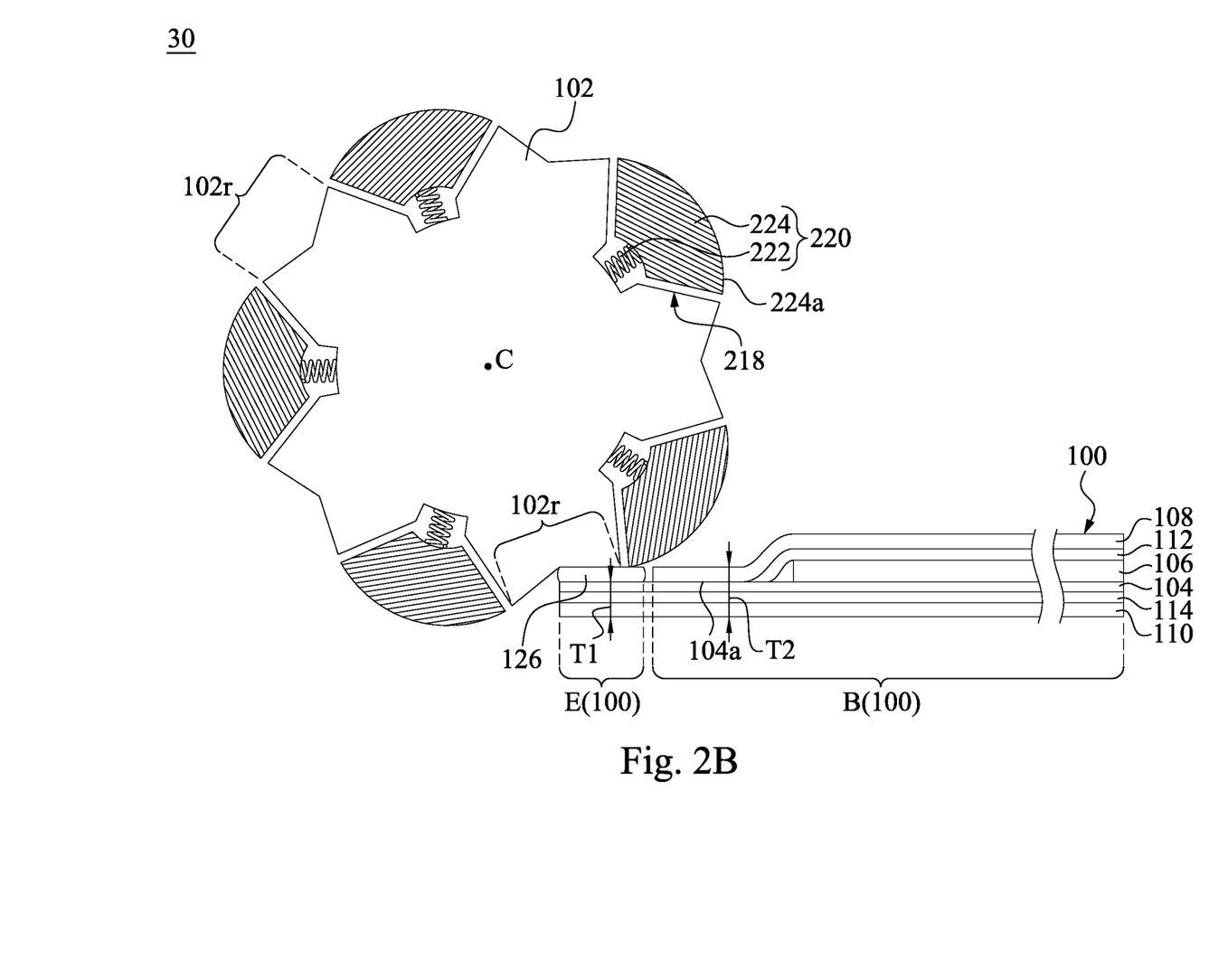
FIG. 2B is a cross-sectional view of an electronic apparatus in accordance with another embodiment of the present disclosure.

FIG. 2B is a cross-sectional view of an electronic apparatus 30 in accordance with another embodiment of the present disclosure. A main difference between the electronic apparatus 30 of the present embodiment and the electronic apparatus 10 in FIG. 2A is that: the roller 102 further includes a retraction assembly 220. The retraction assembly 220 is similar to the retraction assembly 120 in FIG. 1A. The retraction assembly 220 includes a resilient member 222 and a movable part 224. The resilient member 222 is between the movable part 224 and the center C of the roller 102. The movable part 224 has an elastic surface 224a backed onto the resilient member 222 such that the movable part 224 has an elastic property such that collapse effect of the retraction assembly 220 is further enhanced. The rest details of the retraction assembly 220 will not be repeated herein. In the present embodiment, the retraction assembly 220 is adjacent to the recessed portion 102r. During the flexible display device 100 being rolled by the roller 102, the retraction assembly 220 is in contact with the flexible display device 100. When the retraction assembly 220 abuts against the flexible display device 100, the retraction assembly 220 is pressed into the receiving slot 218. By the elastic deformation of the resilient member 222, the resilient member 222 and the movable part 224 can collapse and absorb the stress produced by the flexible display device 100 during the rolling.

In one embodiment, the retraction assembly 220 is a plurality of retraction assemblies. The retraction assemblies 220 are arranged symmetrically with respect to the center C of the roller 102. The recessed portion 102r is a plurality of recessed portions. The recessed portions 102r are arranged symmetrically with respect to the center C of the roller 102. For example, the recessed portions 102r and the retraction assemblies 220 are arranged at intervals. When the flexible display device 100 is rolled by the roller 102, the retraction assembly 220 can be in contact with the flexible display device 100 first. When the retraction assembly 220 abuts the flexible display device 100, the retraction assembly 220 is pressed into the receiving slot 218. By the elastic deformation of the resilient member 222, the resilient member 222 and the movable part 224 can collapse and absorb the stress produced by the flexible display device 100 during the rolling. Then, the recessed portion 102r abuts the flexible display device 100. Therefore, it is possible to prevent the stress concentration at the flexible display device 100 and effectively reduce the risk of misalignment of film layers of the flexible display device 100 due to the stress concentration.

Figure 3:
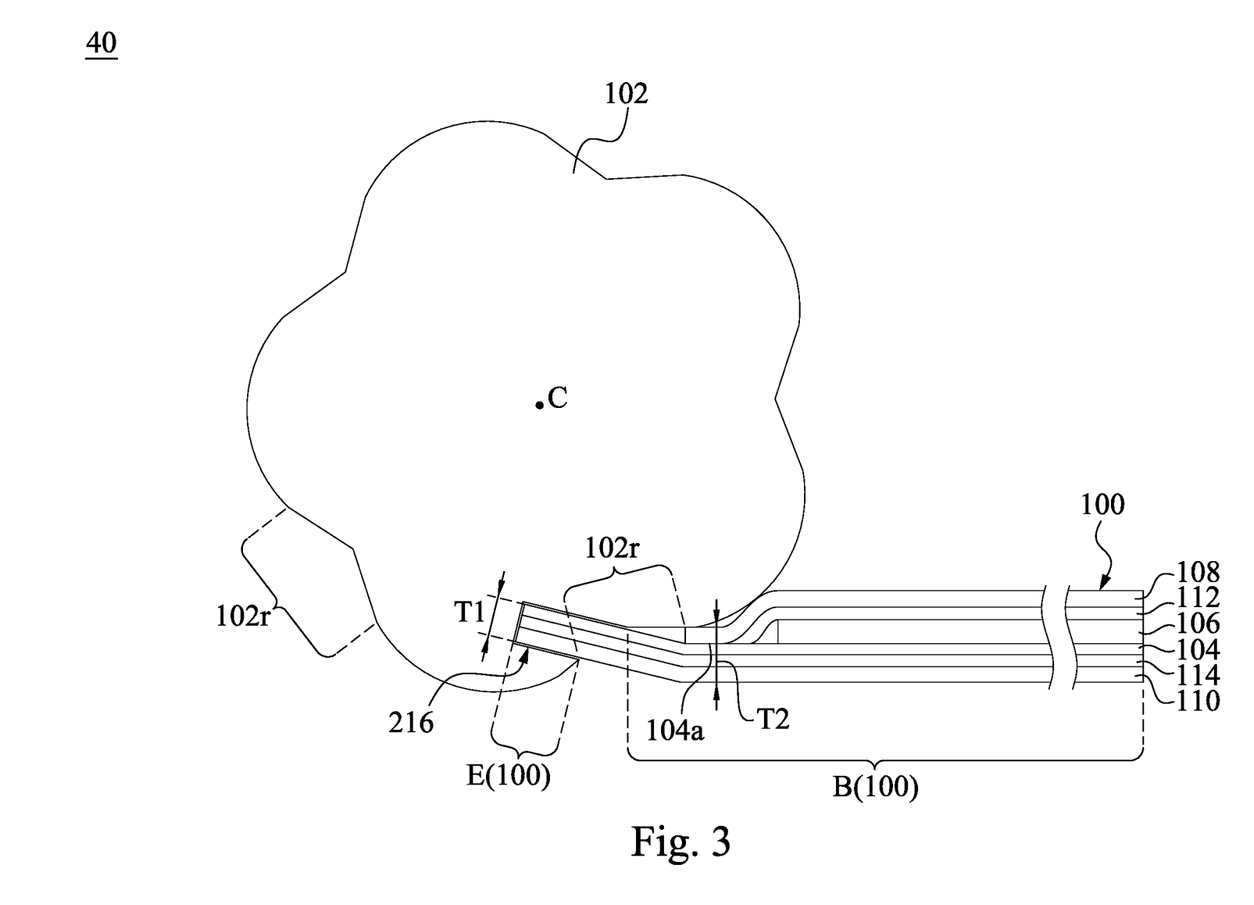
FIG. 3 is a cross-sectional view of an electronic apparatus in accordance with another embodiment of the present disclosure.

FIG. 3 is a cross-sectional view of an electronic apparatus 40 in accordance with another embodiment of the present disclosure. A main difference between the electronic apparatus 40 of the present embodiment and the electronic apparatus 20 in FIG. 2A is that: the electronic apparatus 40 can have the adhesive layer 126 or omit the adhesive layer 126. And the roller 102 includes a holding groove 216. The holding groove 216 is similar to the holding groove 116 in FIG. 1A. Therefore, the rest details of the holding groove 216 are not repeated herein. In the present embodiment, the holding groove 216 is in the recessed portion 102r. In this way, during the rolling, the stress can be avoided from being concentrated at the end portion E of the flexible display device 100. The risk of the misalignment of film layers of the flexible display device 100 can be prevented as well.

Base on the above, the electronic apparatus of the embodiments of the present disclosure, by using the roller having the holding groove, the stress can be avoided from being concentrated at the end portion of the flexible display device. And since the thickness of the end portion of the flexible display device is less than the thickness of the main body portion, a circumference difference between the inside diameter and the outside diameter of the flexible display device after the rolling can be reduced, thereby reduce the stress concentrated at the end portion of the flexible display device and the risk of the misalignment of film layers of the flexible display device can be avoided as well. The roller further includes a retraction assembly disposed in the receiving slot. When the retraction assembly abuts against the flexible display device, the retraction assembly is pressed into the receiving slot. By using the roller having the retraction assembly, during rolling the flexible display device, by the retraction assembly collapsing towards the center of the roller, it is possible to avoid the stress concentration at the flexible display device during the rolling. And the problem of the misalignment of film layers of the flexible display device can be avoided as well. The retraction assembly further includes a movable part and a resilient member. The movable part has an elastic surface backed onto the resilient member. And the junction of the elastic surface and the side wall of the movable part form a round-corner. It is possible to prevent the fracture of the end portion of the flexible display device due to being bent. The roller has the round-corner at the external surface adjoining the inner wall. When the flexible display device is bent, the flexible display device in contact with the round-corner can be stressed uniformly. The risk of fracture of the flexible display device due to the excessive concentration at the end portion of the flexible display device is thus avoided.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic apparatus, comprising:
 a flexible display device, comprising:
  a driving substrate;
  a display layer over the driving substrate; and
  a front protective layer covering the display layer; and
 a roller, wherein an end portion of the flexible display device is fixed to the roller, the roller comprising:
  a holding groove recessed from an external surface of the roller, wherein the end portion of the flexible display device is in the holding groove, and the flexible display device further includes a main body portion outside the holding groove, and a thickness of the end portion is less than a thickness of the main body portion;
  a receiving slot recessed from the external surface of the roller; and
  a retraction assembly disposed in the receiving slot, wherein when the retraction assembly abuts against the flexible display device, the retraction assembly is pressed into the receiving slot, and the receiving slot has opposite sidewalls facing the retraction assembly, and wherein the retraction assembly comprises:
   a resilient member having a first end on a bottom of the receiving slot; and
   a movable part on a second end of the resilient member far away from the first end and is configured to abut against the flexible display device, the movable part has an elastic surface backs onto the resilient member, and a junction of the elastic surface and a side wall of the movable part form a round-corner.

2. The electronic apparatus of claim 1, wherein the holding groove has an inner wall, and the roller has a round-corner at the external surface adjoining the inner wall.

3. The electronic apparatus of claim 1, wherein the retraction assembly is a plurality of retraction assemblies, and the retraction assemblies are arranged symmetrically with respect to a center of the roller.

4. An electronic apparatus, comprising:
 a flexible display device, comprising:
  a driving substrate;
  a display layer over the driving substrate; and
  a front protective layer covering the display layer, wherein a length of the front protective layer is less than a length of the driving substrate;
 a roller, wherein an end portion of the flexible display device is fixed to the roller, the roller comprising:
  a recessed portion;
  an adhesive layer between the end portion of the flexible display device and the recessed portion of the roller;
  a receiving slot recessed from an external surface of the roller; and
  a retraction assembly disposed in the receiving slot, wherein the retraction assembly is adjacent to the recessed portion, and the retraction assembly comprises:
   a resilient member having a first end on a bottom of the receiving slot; and
   a movable part on a second end of the resilient member far away from the first end and is configured to abut against the flexible display device, the movable part has an elastic surface backs onto the resilient member, and the elastic surface is configured to abut against the flexible display device.

5. The electronic apparatus of claim 4, wherein the adhesive layer has a top surface and a bottom surface opposite to each other, and the top surface and the bottom surface of the adhesive layer are in contact with the recessed portion of the roller and a top surface of the driving substrate, respectively.

6. The electronic apparatus of claim 4, wherein the retraction assembly is a plurality of retraction assemblies, and the retraction assemblies are arranged symmetrically with respect to a center of the roller.

7. The electronic apparatus of claim 4, wherein the recessed portion is a plurality of recessed portions, and the recessed portions are arranged symmetrically with respect to a center of the roller.

* * * * *